(12) United States Patent
de Brouwer et al.

(10) Patent No.: US 8,389,662 B2
(45) Date of Patent: Mar. 5, 2013

(54) ISOSORBIDE-BASED POLYCARBONATES, METHOD OF MAKING, AND ARTICLES FORMED THEREFROM

(75) Inventors: Hans de Brouwer, Oisterwijk (NL); Robert Dirk van de Grampel, Tholen (NL); Jan Henk Kamps, Bergen op Zoom (NL); Jan-Pleun Lens, Rotterdam (NL); Hendrik Theodurus van de Grampel, Mijnsheerenland (NL)

(73) Assignee: SABIC Innovative Plastics IP B.V. (NL)

(*) Notice: Subject to any disclaimer, the term of this patent is extended or adjusted under 35 U.S.C. 154(b) by 283 days.

(21) Appl. No.: 12/893,457

(22) Filed: Sep. 29, 2010

(65) Prior Publication Data

US 2011/0160408 A1 Jun. 30, 2011

Related U.S. Application Data

(60) Provisional application No. 61/291,197, filed on Dec. 30, 2009.

(51) Int. Cl.
*C08G 64/18* (2006.01)
*C08G 64/02* (2006.01)
*C08G 63/64* (2006.01)
*C08G 77/448* (2006.01)

(52) U.S. Cl. ............ 528/26; 528/27; 528/29; 528/190; 528/201; 528/295.3; 528/298; 525/439

(58) Field of Classification Search ................. None
See application file for complete search history.

(56) References Cited

U.S. PATENT DOCUMENTS

| | | | |
|---|---|---|---|
| 4,506,066 A | 3/1985 | Medem et al. | |
| 6,103,837 A * | 8/2000 | Hiiro et al. | 525/464 |
| 6,486,294 B1 | 11/2002 | Brack et al. | |
| 6,600,004 B1 | 7/2003 | McCloskey et al. | |
| 7,041,775 B2 | 5/2006 | Martinez et al. | |
| 7,138,479 B2 | 11/2006 | Dhara et al. | |
| 7,666,872 B2 | 2/2010 | Dunkern et al. | |
| 7,786,246 B2 * | 8/2010 | Jansen et al. | 528/196 |
| 2005/0143549 A1 | 6/2005 | Schijndel et al. | |
| 2005/0143554 A1 | 6/2005 | Dhara et al. | |
| 2006/0002814 A1 | 1/2006 | Chatterjee et al. | |
| 2006/0149024 A1 | 7/2006 | Ono et al. | |
| 2008/0015331 A1 | 1/2008 | Terado et al. | |
| 2008/0230751 A1 | 9/2008 | Li et al. | |
| 2008/0269386 A1 | 10/2008 | Chakravarti et al. | |
| 2009/0105393 A1 | 4/2009 | Jansen et al. | |
| 2009/0105443 A1 | 4/2009 | Brack et al. | |
| 2009/0105444 A1 | 4/2009 | Chatterjee et al. | |
| 2009/0312503 A1 | 12/2009 | Brack et al. | |
| 2010/0076130 A1 | 3/2010 | Miyake et al. | |
| 2010/0099832 A1 | 4/2010 | Jansen et al. | |
| 2011/0160406 A1* | 6/2011 | de Brouwer et al. | 525/393 |
| 2011/0160408 A1 | 6/2011 | de Brouwer et al. | |
| 2011/0160422 A1 | 6/2011 | Kamps et al. | |

FOREIGN PATENT DOCUMENTS

| | | |
|---|---|---|
| EP | 0524731 A1 | 1/1993 |
| EP | 2033981 A1 | 3/2009 |
| EP | 2053072 A1 | 4/2009 |
| GB | 1079686 | 8/1967 |
| JP | 200467990 A | 3/2004 |
| JP | 2005132872 A | 5/2005 |
| JP | 2006232897 A | 9/2006 |
| JP | 2008291053 A | 12/2008 |
| JP | 2009063976 A | 3/2009 |
| JP | 2009144013 A | 7/2009 |
| JP | 2009191226 A | 8/2009 |
| WO | 0210111 A1 | 2/2002 |
| WO | 2005116110 A1 | 12/2005 |
| WO | 2006036545 A1 | 4/2006 |
| WO | 2008020636 A1 | 2/2008 |

OTHER PUBLICATIONS

Japanese Publication No. 2004067990; Publication Date: Mar. 4, 2004; Abstract Only; 1 page.
International Publication No. 2005116110; Publication Date: Dec. 8, 2005; Abstract Only, 1 page.
Japanese Patent No. 2005132872 (A); Publication Date: May 26, 2005; Machine Translation; 9 Pages.
Japanese Publication No. 2006232897; Publication Date: Sep. 7, 2006; Abstract Only; 2 Pages.
International Publication No. 2008020636 (A1); Publication Date: Feb. 21, 2008; Abstract Only; 1 page.
Japanese Publication No. 2009063976; Publication Date: Mar. 26, 2009; Abstract Only, 1 page.
Betiku et al.; "Synthesis and Characterization of Isosorbide Carbonate: Lactide Copolymers"; Polymer Preprints (American Chemical Society, Division of Polymer Chemistry); vol. 48, Issue 2; 2007; pp. 802-803; Abstract Only; Document No. XP002529896.
Braun, et al.; Polyesters with 1.4:3.8-dianhydrosobritol as Polymeric Plasticizers for PVC; Die Angewandte Makromolekulare Chemie; vol. 199; 1992; pp. 191-205.
Kambour et al.; "Tough, Transparent Heat- and Flame-Resistant Thermoplastics via Silicone Block-Modified Bisphenol Fluorenone Polycarbonate"; Journal of Applied Polymer Science; vol. 20; 1976; pp. 3275-3293.

(Continued)

*Primary Examiner* — David Buttner
(74) *Attorney, Agent, or Firm* — Cantor Colburn LLP

(57) ABSTRACT

Disclosed herein is a polycarbonate polymer comprising: an isosorbide unit, a polysiloxane unit, and an aliphatic unit different from the isosorbide unit, wherein the isosorbide unit, polysiloxane unit, and aliphatic unit are each carbonate, or a combination of carbonate and ester units, the aliphatic unit different from the isosorbide unit is derived from an aliphatic oligomer having a molecular weight of 900 to 4000, and the calculated bio-content is greater than or equal to 40 weight percent, based on the total weight of the polycarbonate polymer.

19 Claims, No Drawings

OTHER PUBLICATIONS

Kricheldorf et al.; "Polymers of Carbonic Acid. 22. Cholesteric Polycarbonates Derived from (S)-((2-Methylbutyl)thio)hydroquinone or Isosorbide"; Macromolecules; vol. 29; 1996; pp. 8077-8082.

"Synthesis and characterization of isosorbide carbonate: lactide copolymers"; XP002529896, 2007; 2 pages.

Japanese Publication No. 2009144013, Published Jul. 2, 2009, Abstract Only, 1 page.

Japanese Publication No. 2009191226, Published Aug. 27, 2009, Abstract Only, 1 page.

International Search Report; International Application No. PCT/US2010/062184; International Filing Date: Dec. 28, 2010; Date of Mailing: Apr. 11, 2011; 5 Pages.

Written Opinion of the International Searching Authority; International Application No. PCT/US2010/062184; International Filing Date: Dec. 28, 2010; Date of Mailing: Apr. 11, 2011; 7 Pages.

* cited by examiner

ISOSORBIDE-BASED POLYCARBONATES, METHOD OF MAKING, AND ARTICLES FORMED THEREFROM

CROSS REFERENCE TO RELATED APPLICATIONS

This application claims the benefit of U.S. Provisional Patent Application No. 61/291,197 filed on Dec. 30, 2009, which is incorporated by reference herein in its entirety.

BACKGROUND

This disclosure relates to polycarbonates comprising aliphatic dihydroxy compounds, and in particular to isosorbide-based polycarbonates, and methods of manufacture thereof.

Polymers based on aliphatic dihydroxy compounds derived from biologically-based sources are of great interest to the plastics industry and to the manufacturing industry, for the preparation of materials and products that can be derived from inexpensive, renewable sources and that also may be biodegradable, and thereby have a low net environmental impact. Of particular interest are polymers based on isosorbides, which are more specifically referred to as 2,6-dioxabicyclo[3.3.0]octan-4,8-dihydroxy compound, 1,4:3,6-dianhydro-D-glucitol, and 2,3,3a,5,6,6a-hexahydrofuro[3,2-b] furan-3,6-dihydroxy compound, and isomers of these. These materials are of great interest to the chemical industry, and in particular in the production of polymeric materials such as polycarbonates, because such aliphatic dihydroxy compounds can be produced from renewable resources, namely sugars, rather than from the petroleum feed stocks used to prepare other monomers useful in the production of polycarbonates, such as bisphenol monomers.

However, for practical applications, polycarbonate incorporating isosorbide needs a balance of properties to be useful. A problem that accompanies inclusion of such biologically derived materials in polycarbonates is maintaining the desired mechanical and optical properties of the polycarbonate during and after high temperature processing, such as encountered during extrusion and molding. Polycarbonates that include isosorbide that otherwise have desirable properties can have insufficient impact and heat resistance properties.

There accordingly remains a need in the art for an isosorbide-based polycarbonate having a sufficiently high heat resistance and impact performance.

BRIEF DESCRIPTION

Described herein is a polycarbonate polymer comprising: an isosorbide unit, a polysiloxane unit, and an aliphatic unit different from the isosorbide unit, wherein the isosorbide unit, polysiloxane unit, and aliphatic unit are each carbonate, or a combination of carbonate and ester units, the aliphatic unit different from the isosorbide unit is derived from an aliphatic oligomer having a molecular weight of 900 to 4000, and the calculated bio-content is greater than or equal to 40 weight percent, based on the total weight of the polycarbonate polymer.

In another embodiment, a thermoplastic composition comprises the polycarbonate polymer, and an additional polymer, an additive, or a combination of additional polymer and additive.

DETAILED DESCRIPTION

Described herein are isosorbide-based polycarbonates including polyester-polycarbonates. The polycarbonates and polyester-polycarbonates comprise units derived from isosorbide, aliphatic units derived from an aliphatic oligomeric polyester polyol having a molecular weight of 900 to 4000, and units derived from polysiloxane. The inclusion of polysiloxane units and aliphatic units derived from an aliphatic oligomeric polyester polyol results in a pronounced improvement in impact strength without a substantial decrease in heat resistance compared to isosorbide homopolycarbonates and copolycarbonates of isosorbide and aromatic units. Heat resistance is evaluated by a combination of glass transition temperature, heat deformation temperature and Vicat data. These physical properties and methods of determining them are discussed in greater detail below.

Described herein are isosorbide-based polycarbonates including polyester-polycarbonates. The polycarbonates and polyester-polycarbonates comprise units derived from isosorbide, aliphatic units derived from an aliphatic oligomer having a molecular weight of 900 to 4000, and units derived from polysiloxane. The inclusion of polysiloxane units and aliphatic units derived from an aliphatic oligomer results in a pronounced improvement in impact strength without a substantial decrease in heat resistance compared to isosorbide homopolycarbonates and copolycarbonates of isosorbide and aromatic units. Heat resistance is evaluated by a combination of glass transition temperature, heat deformation temperature and Vicat data. These physical properties and methods of determining them are discussed in greater detail below.

As used herein, the term "polycarbonate" includes copolycarbonates have repeating structural carbonate units of the formula (1):

wherein the $R^1$ groups comprise groups that are derived from isosorbide, siloxane containing dihydroxy compounds, aliphatic oligomers, dihydroxy compound and optionally aromatic dihydroxy compounds. It is explicitly contemplated that the polycarbonate polymer can be free of $R^1$ groups derived from aromatic dihydroxy compounds. It is also explicitly contemplated that the polycarbonate polymer can be free of $R^1$ groups derived from bisphenol A.

The isosorbide-based carbonate units are shown in formula (2):

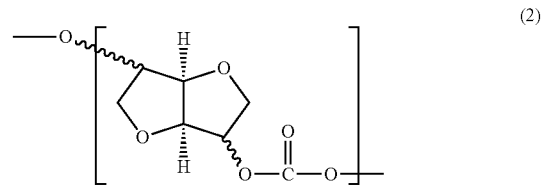

The isosorbide-based carbonate units of formula (2) can be derived from a mixture of isomers of isosorbide or from individual isomers of isosorbide. The stereochemistry for the isosorbide-based carbonate units of formula (2a) is not particularly limited. Specifically, isosorbide has the general formula (2a):

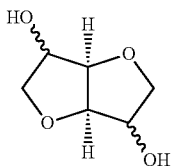

(2a)

and can be a single dihydroxy compound isomer or mixture of dihydroxy compound isomers. The stereochemistry for the isosorbide of general formula (2a) is also not particularly limited. These dihydroxy compounds are prepared by the dehydration of the corresponding hexitols. Hexitols are produced commercially from the corresponding sugars (aldohexose). Aliphatic dihydroxy compounds of formula (2a) include 1,4; 3,6-dianhydro-D glucitol, of formula (2b); 1,4; 3,6-dianhydro-D mannitol, of formula (2c); and 1,4; 3,6-dianhydro-L iditol, of formula (2d), and combinations of two or more of the aforementioned dihydroxy compounds. Isosorbides are available commercially from various chemical suppliers including Cargill, Roquette, and Shanxi.

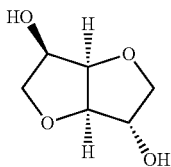

(2b)

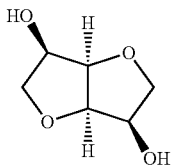

(2c)

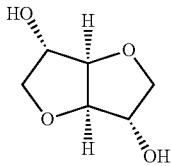

(2d)

In a specific embodiment, the dihydroxy compound of the formula (2b) is desirable because it is a rigid, chemically and thermally stable aliphatic dihydroxy compound that can be used to produce higher Tg copolymers than the other dihydroxy compounds of formulas (2c) and (2d).

The isosorbide units can be present in an amount of 50 to 92 weight percent (weight percent), specifically 60 to 90 weight percent, and more specifically 70 to 89 weight percent based on the total weight of dihydroxy compound, polyol and diacid used to make the polycarbonate.

The polysiloxane units are derived from a siloxane-containing dihydroxy compound (also referred to herein as "hydroxyaryl end-capped polysiloxanes") that comprises diorganosiloxane units blocks of formula (15):

(15)

wherein each occurrence of R is same or different, and is a $C_{1-13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. Where a transparent isosorbide-based polycarbonate is desired, R does not contain any halogen. Combinations of the foregoing R groups can be used in the same isosorbide-based polycarbonate.

The value of E in formula (15) can vary widely depending on the type and relative amount of each of the different units in the isosorbide-based polycarbonate, the desired properties of the isosorbide-based polycarbonate, and like considerations. Generally, E can have an average value of about 2 to about 1,000, specifically about 2 to about 500, more specifically about 2 to about 100. In an embodiment, E has an average value of about 4 to about 90, specifically about 5 to about 80, and more specifically about 10 to about 70. Where E is of a lower value, e.g., less than about 40, it can be desirable to use a relatively larger amount of the units containing the polysiloxane. Conversely, where E is of a higher value, e.g., greater than about 40, it can be desirable to use a relatively lower amount of the units containing the polysiloxane.

The polysiloxane blocks can be provided by repeating structural units of formula (16):

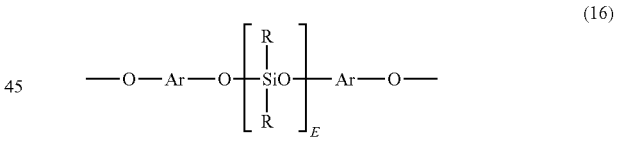

(16)

wherein E is as defined above; each R is the same or different, and is as defined above; and each Ar is the same or different, and is a substituted or unsubstituted $C_6$-$C_{30}$ arylene group, wherein the bonds are directly connected to an aromatic moiety. Ar groups in formula (16) can be derived from a $C_6$-$C_{30}$ dihydroxyaromatic compound, for example a dihydroxyaromatic compound of formula (4) or (8) described in detail below. Combinations comprising at least one of the foregoing dihydroxyaromatic compounds can also be used. Exemplary dihydroxyaromatic compounds are 1,1-bis(4-hydroxyphenyl)methane, 1,1-bis(4-hydroxyphenyl)ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), 1,1-bis(4-hydroxy-3-methylphenyl)cyclohexane, and 1,1-bis(4-hydroxy-t-butylphenyl) propane, or a combination comprising at least one of the foregoing dihydroxy compounds.

Polycarbonates comprising such units can be derived from the corresponding dihydroxy compound of formula (16a):

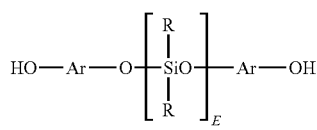
(16a)

wherein Ar and E are as described above. Compounds of formula (16a) can be obtained by the reaction of a dihydroxyaromatic compound with, for example, an alpha, omega-bis-acetoxy-polydiorganosiloxane oligomer under phase transfer conditions. Compounds of formula (16a) can also be obtained from the condensation product of a dihydroxyaromatic compound, with, for example, an alpha, omega bis-chloro-polydimethylsiloxane oligomer in the presence of an acid scavenger.

In another embodiment, polydiorganosiloxane blocks comprises units of formula (17):

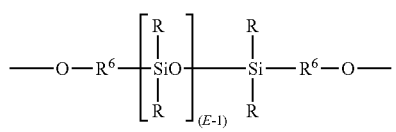
(17)

wherein R and E are as described above, and each $R^6$ is independently a divalent $C_1$-$C_{30}$ organic group, and wherein the oligomerized polysiloxane unit is the reaction residue of its corresponding dihydroxy compound. The polysiloxane blocks corresponding to formula (17) are derived from the corresponding dihydroxy compound of formula (17a):

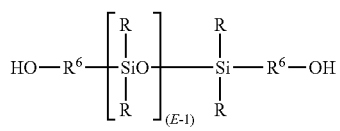
(17a)

wherein R and E and $R^6$ are as described for formula (17).

The polydiorganosiloxane blocks can be provided by repeating structural units of formula (18):

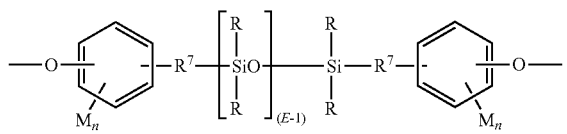
(18)

wherein R and E are as defined above. $R^7$ in formula (18) is a divalent $C_2$-$C_8$ aliphatic group. Each M in formula (18) can be the same or different, and is a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In an exemplary combination, M can be bromo or chloro, an alkyl group such as methyl, ethyl, or propyl, an alkoxy group such as methoxy, ethoxy, or propoxy, or an aryl group such as phenyl, chlorophenyl, or tolyl; $R^7$ can be a dimethylene, trimethylene or tetramethylene group; and R can be a $C_{1-8}$ alkyl, haloalkyl such as trifluoropropyl, cyanoalkyl, or aryl such as phenyl, chlorophenyl or tolyl. R can be methyl, or a combination of methyl and trifluoropropyl, or a combination of methyl and phenyl. M can be methoxy, n can be one, $R^7$ can be a divalent $C_1$-$C_3$ aliphatic group, and R can be methyl.

Polysiloxane-polycarbonates comprising units of formula (18) can be derived from the corresponding dihydroxy polydiorganosiloxane (18a):

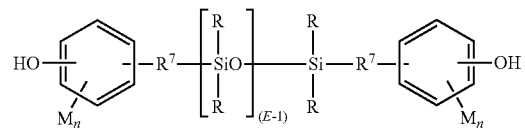
(18a)

wherein each of R, E, M, $R^7$, and n are as described above. When referring to definitions of variables "as described above", all definitions of the individual variables, singly or in combination are included. Such dihydroxy polysiloxanes can be made by effecting a platinum-catalyzed addition between a siloxane hydride of formula (19):

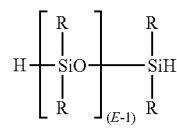
(19)

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

The polysiloxane units can be present in an amount of 3 to 30 weight percent, specifically 4 to 25 weight percent, more specifically 5 to 15 weight percent, and more specifically 5 to 10 weight percent, based on the total weight of dihydroxy compound, polyol and diacid used to make the polycarbonate.

The total siloxane content of the polycarbonate can be 3 to 25 weight percent, based on the total weight of the polycarbonate. Within this range the siloxane content can be 4 to 15 weight percent, or, more specifically, 4 to 10 weight percent.

As disclosed herein, the aliphatic-based polycarbonate further comprises, in addition to carbonate units of formula (2), aliphatic units that are derived from aliphatic oligomers having a weight average molecular weight of 900 to 4000, or, specifically 900 to 3000, or more specifically, 900 to 2500. The aliphatic oligomers can comprise repeating units derived from aliphatic fatty acids. The aliphatic oligomers may be acid terminated which results in ester linkages or hydroxyl terminated which results in carbonate linkages.

The aliphatic oligomers may be linear or branched, difunctional alkylene or alkenylene compounds that are derived from a monomer having the basic formula (10):

wherein X represents a carboxylic acid (—C(O)OH) or a methylol group (CH$_2$—OH). L represents a group having greater than or equal to 60 carbon atoms. L may also include cyclic carbon substructures, specifically monocyclic, polycyclic, or fused polycyclic groups.

The aliphatic oligomers can be synthesized by the addition reaction of two or more unsaturated aliphatic acids. "Unsaturated", as used herein, can mean monounsaturated, diunsaturated, triunsaturated, polyunsaturated, or a combination of at least one of the foregoing. It will be understood that for unsaturated sites in the aliphatic diacid, the cis isomer, trans isomer, or a combination of cis and trans isomers can be present within reactant unsaturated aliphatic acid (such as where a single aliphatic diacid can have at least one each of a cis and trans isomerized double bond), or different isomers of unsaturated aliphatic acids may be combined (such as where a combination of a trans aliphatic acid and a cis aliphatic acid is used).

Reaction of two unsaturated aliphatic acids can be accomplished by a carbon-carbon bond forming reaction between unsaturated sites in different unsaturated aliphatic acids, and can result in formation of a single bond, multiple single bonds (where an at least diunsaturated aliphatic monomer is used), cyclodimerization to form a bridging carbocycle, or other such carbon-carbon bonding between the unsaturated aliphatic acids. It will be understood that such reactions can produce a mixture of products and isomers, and that all such combinations of products and isomers are contemplated herewith. The reaction between unsaturated diacids may be accomplished by radical initiation, metal catalysis, photoinitiation, acid catalysis, or any suitable method. In an embodiment, the reaction of unsaturated aliphatic acids to form aliphatic oligomer can be effected by use of a catalytic inorganic material including a clay having catalytic properties such as montmorillonite. It is also possible that the aliphatic oligomer can be derived from the condensation of two shorter chain unsaturated aliphatic acids such as, for example, acrylic acid, methacrylic acid, crotonic acid, or the like, with one or more unsaturated compounds that do not have acid groups. It is desirable that the oligomer is derived from plant based biological sources (such as e.g., vegetable oils), but may also be preparable from other commercially available feedstocks such as petroleum derivatives, coal extracts, animal sources, other plant sources such as timber, and the like, and so should not be considered as limited to vegetable or crop sources. Aliphatic oligomers derived from natural sources are available commercially from chemical suppliers including Uniqema, Cognis, and Oleon.

The aliphatic oligomers can also be synthesized by coupling, through a condensation reaction such as an esterification reaction, two or more fatty acids where at least one fatty acid is functionalized. Exemplary linkages between fatty acids include ester linkages and ether linkages. The oligomer can comprise polyester dimers of C$_{30-45}$ aliphatic diacids, polyester trimers of C$_{30-45}$ aliphatic diacids and combinations of dimers and trimers of C$_{30-45}$ aliphatic diacids, The aliphatic units derived from an aliphatic oligomer can be present in an amount of 5 to 20 weight percent, specifically 6 to 15 weight percent, based on the total weight of dihydroxy compound, polyol and diacid used to make the polycarbonate.

The polycarbonate can further comprise a carbonate unit derived from an aromatic dihydroxy compound (an aromatic unit), such as for example a bisphenol, that differs from the aliphatic dihydroxy compound of formula (2a). In one embodiment, each further R$^1$ group in formula (1) is a divalent aromatic group, for example derived from an aromatic dihydroxy compound of the formula (3):

wherein each of A$^1$ and A$^2$ is a monocyclic divalent arylene group, and Y$^1$ is a single bond or a bridging group having one or two atoms that separate A$^1$ from A$^2$. In an exemplary embodiment, one atom separates A$^1$ from A$^2$. In another embodiment, when each of A$^1$ and A$^2$ is phenylene, Y$^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group Y$^1$ can be a hydrocarbon group or a saturated hydrocarbon group such as methylene, cyclohexylidene, or isopropylidene.

Included within the scope of formula (3) are bisphenol compounds of general formula (4):

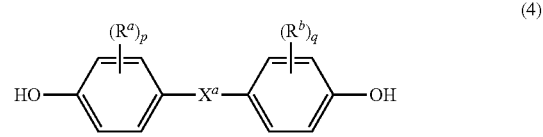

wherein R$^a$ and R$^b$ each represent a halogen atom or a monovalent hydrocarbon group and can be the same or different; p and q are each independently integers of 0 to 4; and X$^a$ represents a single bond or one of the groups of formulas (5a) or (5b):

wherein R$^c$ and R$^d$ are each independently hydrogen, C$_{1-12}$ alkyl, C$_{1-12}$ cycloalkyl, C$_{7-12}$ arylalkyl, C$_{1-12}$ heteroalkyl, or cyclic C$_{7-12}$ heteroarylalkyl, and R$^e$ is a divalent C$_{1-12}$ hydrocarbon group. In particular, R$^c$ and R$^d$ are each the same hydrogen or C$_{1-4}$ alkyl group, specifically the same C$_{1-3}$ alkyl group, even more specifically, methyl.

In an embodiment, R$^c$ and R$^d$ taken together represent a C$_{3-20}$ cyclic alkylene group or a heteroatom-containing C$_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary embodiment, $X^a$ is a substituted $C_{3-18}$ cycloalkylidene of the formula (6):

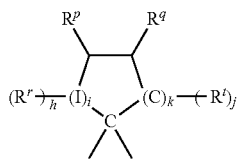

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When k is 1 and i is 0, the ring as shown in formula (6) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (7):

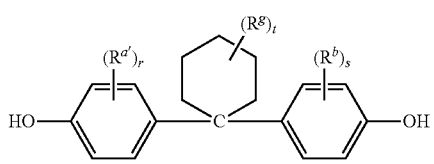

wherein substituents $R^{a'}$ and $R^{b'}$ can be aliphatic or aromatic, straight chain, cyclic, bicyclic, branched, saturated, or unsaturated, and $R^g$ is $C_{1-12}$ alkyl or halogen, r and s are independently integers from 0 to 4, and t is an integer of 0 to 10. It will be understood that hydrogen fills each valency when r is 0, s is 0, and t is 0. In one embodiment, each $R^{a'}$ and $R^{b'}$ is independently $C_{1-12}$ alkyl. In a specific embodiment, where r and/or s is 1 or greater, at least one of each of $R^{a'}$ and $R^{b'}$ are disposed meta to the cyclohexylidene bridging group. The substituents $R^{a'}$, $R^{b'}$, and $R^g$ may, when comprising an appropriate number of carbon atoms, be straight chain, cyclic, bicyclic, branched, saturated, or unsaturated. In a specific embodiment, $R^{a'}$, $R^{b'}$, and $R^g$ are each $C_{1-4}$ alkyl, specifically methyl. In still another embodiment, $R^{a'}$, $R^{b'}$, and $R^g$ is a $C_{1-3}$ alkyl, specifically methyl, r and s are 0 or 1, and t is 0 to 5, specifically 0 to 3. Useful cyclohexane-containing bisphenols of formula (7) where t is 3, r and s are 0, and $R^g$ is methyl include, for example those derived from the reaction product of two moles of a phenol with one mole of a hydrogenated isophorone such as e.g., 3,3,5-trimethylcyclohexanone, are useful for making polycarbonate polymers with high glass transition temperatures and high heat distortion temperatures. Such isophorone-bridged, bisphenol-containing polycarbonates, or a combination comprising at least one of the foregoing with other bisphenol polycarbonates, can be obtained from Bayer Co. under the APEC® trade name.

Some illustrative, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Specific examples of the types of bisphenol compounds represented by formula (3) include 1,1-bis(4-hydroxyphenyl) methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, 3,3-bis (4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one of the foregoing dihydroxy aromatic compounds can also be used.

Other types of dihydroxy compounds can be present in the isosorbide-based polycarbonate. For example, a $R^1$ can also be further derived from a dihydroxy aromatic compound of formula (8):

(8)

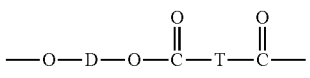

(9)

wherein each $R^f$ is independently $C_{1-12}$ alkyl, or halogen, and u is 0 to 4. It will be understood that $R^f$ is hydrogen when u is 0. Typically, the halogen can be chlorine or bromine. In an embodiment, compounds of formula (8) in which the —OH groups are substituted meta to one another, and wherein $R^f$ and u are as described above, are also generally referred to herein as resorcinols. Examples of compounds that can be represented by the formula (8) include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Carbonate units derived from an aromatic dihydroxy compound (aromatic units) can be present in an amount of 0 to 50 weight percent, specifically 0 to 40 weight percent, and more specifically 0 to 30 weight percent based on the total weight of dihydroxy compound, polyol and diacid used to make the polycarbonate.

Various types of polycarbonates with branching groups are also contemplated as being useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of about 0.05 to about 2.0 weight percent. Mixtures comprising linear polycarbonates and branched polycarbonates can be used.

Polycarbonates also include copolymers comprising carbonate units and ester units, and combinations comprising at least one of homopolycarbonates and copolycarbonates. A specific type of polycarbonate copolymer of this type is a polyester carbonate, also known as a polyester-polycarbonate. Such copolymers further contain, in addition to recurring carbonate chain units of the formula (1), carbonate units derived from oligomeric ester-containing dihydroxy compounds (also referred to herein as hydroxy end-capped oligomeric arylate esters) comprising repeating units of formula (9):

wherein D is a divalent group derived from a dihydroxy compound, and may be, for example, a $C_{2-120}$ alkylene group, a $C_{6-120}$ alicyclic group, a $C_{6-120}$ aromatic group or a $C_{2-200}$ polyoxyalkylene group in which the alkylene groups contain 2 to about 6 carbon atoms, specifically 2, 3, or 4 carbon atoms; and T is a divalent group derived from a dicarboxylic acid, and may be, for example, a $C_{2-120}$ alkylene group, a $C_{6-120}$ alicyclic group, a $C_{6-120}$ alkyl aromatic group, or a $C_{6-120}$ aromatic group.

Generally, polyester-polycarbonates can have the structure of formula (9) where in some embodiments D is a $C_{2-120}$ alkylene group having a straight chain, branched chain, or cyclic (including polycyclic) structure. In other embodiments, D is derived from a dihydroxy aromatic compound of formula (3) above. In yet other embodiments, D is derived from a dihydroxy aromatic compound of formula (7) above. In a specific embodiment, as disclosed herein, D is a group derived from an aliphatic dihydroxy compound of formula (2a). Where the aliphatic chain is long, for example greater than about 18 carbon atoms, it is necessary that it is branched to prevent crystallization. Thus, in a specific embodiment, D is a $C_{14}$-$C_{120}$ alkylene group having a branched chain structure, such that the aliphatic alkylene chain will not crystallize in the polymer.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, D is a $C_{2-6}$ alkylene group and T is p-phenylene, m-phenylene, naphthalene, a divalent cycloaliphatic group, or a combination thereof. This class of polyester includes the poly(alkylene terephthalates).

Where ester units are formed in the absence of other linking chemistry (e.g., carbonate precursors such as phosgene, or diaryl carbonates), the individual ester oligomerize to form a polyester unit, also referred to as a polyester block. The polyester unit can then be copolymerized in the presence of carbonate precursor and dihydroxy compounds to form the polyester-polycarbonate. The number of repeating ester units in a polyester unit of such a polyester-polycarbonate is typically greater than or equal to 4, specifically greater than or equal to 5, and more specifically greater than or equal to 8. Also in an embodiment, the number of ester units of formula (9) is less than or equal to 100, specifically less than or equal to 90, more specifically less than or equal to 70. It will be understood that the low and high endpoint values for the number of ester units of formula (9) present are independently combinable. In a specific embodiment, the number of ester units of formula (9) in a polyester-polycarbonate can be 4 to 50, specifically 5 to 30, more specifically 8 to 25, and still more specifically 10 to 20. Conversely, where ester units are formed in the presence of other linking chemistry such as carbonate precursors, a more random polyester-polycarbonate can form, with individual ester units or smaller blocks of repeating ester units of 2 or 3, interspersed with one or more of the other linking chemistry (e.g. carbonate units). Overall, in the polyester-polycarbonate, the molar ratio of ester units to carbonate units in the polyester-polycarbonate copolymers may vary broadly, for example 1:99 to 99:1, specifically 10:90 to 90:10, more specifically 25:75 to 75:25, depending on the desired properties of the final composition.

The ester units of a polyester-polycarbonate may be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol A. In a specific embodiment, the carbonate units of a polyester-polycarbonate can be derived from aliphatic dihydroxy compounds of formula (2a). Alternatively or in addition, in an exemplary embodiment, the carbonate units can be derived from resorcinol and/or bisphenol A. In another exemplary embodiment, the carbonate units of the polyester-polycarbonate can be derived from resorcinol and bisphenol A in a resulting molar ratio of resorcinol carbonate units to bisphenol A carbonate unit of 1:99 to 99:1.

The calculated content of biologically derived material in the isosorbide-based polycarbonate (the calculated bio-content) can be greater than or equal to 40 weight percent, specifically greater than or equal to 60 weight percent, and still more specifically greater than or equal to 65 weight percent, based on the total weight of the isosorbide-based polycarbonate. The calculated bio-content can be 75 to 85 weight percent based on the total weight of the isosorbide-based polycarbonate.

The bio-content expressed in weight percent represents the combined weight of isosorbide units and any other units derived from renewable materials in the polycarbonate divided by the total weight of the polycarbonate. Bio-content can also be determined using radiocarbon and isotope ratio mass spectrometry to determine the carbon fraction in a material that is coming from renewable bio-sources (see, for example ASTM D6866-06a).

Molecular weight for the polycarbonates, including the isosorbide-based polycarbonates disclosed herein, can be determined by gel permeation chromatography using calibration methods based on well defined polystyrene (PS) standards of narrow molar mass distribution. Generally polycarbonates can have a weight average molecular weight (Mw), of greater than about 5,000 g/mol relative to PS standards. In an embodiment, the isosorbide-based polycarbonates can have an Mw of greater than or equal to about 39,000 g/mol, relative to PS standards. In a specific embodiment, the isosorbide-based polycarbonate (including isosorbide-based polyester-polycarbonate) has an Mw based on PS standards of 39,000 to 100,000 g/mol, specifically 40,000 to 90,000 g/mol, more specifically 40,000 to 80,000 g/mol, and still more specifically 40,000 to 70,000 g/mol.

In an embodiment, the isosorbide-based polycarbonate has a number averaged molecular weight (Mn) based on PS standards of 15,000 to 65,000 g/mol, specifically 16,000 to 60,000 g/mol, more specifically 17,000 to 55,000 g/mol, and still more specifically 18,000 to 50,000 g/mol. The polydispersity (Mw/Mn) for the isosorbide-based polycarbonate is less than or equal to 3, specifically less than or equal to 2.5, more specifically less than or equal to 2.3. In a specific embodiment, the polydispersity is 2.0 to 2.3.

Molecular weight (Mw and Mn) as described herein, and polydispersity as calculated therefrom, is as determined using gel permeation chromatography (GPC), using a crosslinked styrene-divinylbenzene column, and either PS or PC standards as specified. GPC samples are prepared in a solvent such as methylene chloride or chloroform at a concentration of about 1 mg/ml, and are eluted at a flow rate of about 0.2 to 1.0 ml/min.

The glass transition temperature (Tg) of the isosorbide-based polycarbonates can be 130 to 170° C. Within this range, the glass transition temperature of the isosorbide-based polycarbonate can be 140 to 170° C., specifically 150 to 170° C.

The polycarbonates can have a melt volume ratio (MVR) of 0.5 to 80, more specifically 2 to 40 $cm^3$/10 minutes, measured at 250° C. under a load of 5 kg according to ASTM D1238-04.

The polycarbonates can have a notched Izod impact strength greater than or equal to 13 kilojoules per square meter ($kJ/m^2$) at 23° C. Within this range the notched Izod impact strength can be greater than or equal to 20 $kJ/m^2$, specifically greater than or equal to 30 $kJ/m^2$. Notched Izod impact strength is determined according to ISO 180/1A. The notched Izod impact strength of the polycarbonate can be less than or equal to 200 $kJ/m^2$ As disclosed in U.S. Patent Publication Nos. 20090105393 and 20090105444, JP2009-191226 and JP2009-144013, the isosorbide-based polycarbonate or polyester-polycarbonate can be prepared by a melt polymerization process. Generally, in the melt polymerization process, polycarbonates are prepared by co-reacting, in a molten state, the dihydroxy reactant(s) (i.e., isosorbide, aliphatic dihydroxy compound and/or aliphatic diacid, and any additional dihydroxy compound) and a diaryl carbonate ester, such as diphenyl carbonate, or more specifically in an embodiment, an activated carbonate such as bis(methyl salicyl) carbonate, in the presence of a transesterification catalyst. Volatile monohydric phenol is removed from the molten reactants by distillation and the polymer is isolated as a molten residue. Methods of polymerization are described in greater detail in U.S. Pat. No. 7,666,872 and U.S. Patent Publication No. 20090105444, which are incorporated by reference herein in their entirety.

In addition to the isosorbide-based polycarbonates described above, thermoplastic compositions comprising combinations of the isosorbide-based polycarbonate with other thermoplastic polymers that do not comprise the isosorbide-based carbonate units of formula (2) can be prepared using, for example other polycarbonates including homopolycarbonates and other polycarbonate copolymers (i.e., copolycarbonates) comprising different $R^1$ moieties in the carbonate units, polysiloxane-polycarbonates, polyester-carbonates (also referred to as a polyester-polycarbonates), polyesters, impact modifiers, or a combination comprising at least one of the foregoing additional polymers. These combinations can comprise 1 to 99 wt %, specifically 10 to 90, more specifically 20 to 80 weight percent of the isosorbide-based polycarbonate, with the remainder of the compositions being other of the foregoing additional polymers, and/or additives as described below. In an embodiment, the thermoplastic composition comprises the isosorbide-based polycarbonate, an additional polymer, and/or an additive. In another specific embodiment, the thermoplastic composition comprising the isosorbide-based polycarbonates has a total bio-content of greater than or equal to 50 weight percent, specifically greater than or equal to 55 weight percent, more specifically greater than or equal to 60 weight percent, and still more specifically greater than or equal to 65 weight percent, based on the total weight of isosorbide-based polycarbonate, any additional polymer, and an additive exclusive of and prior to addition of any filler.

For example, the thermoplastic composition can further include as an additional polymer an impact modifier(s). Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

In addition to the isosorbide-based polycarbonate, the thermoplastic composition can include various additives ordinarily incorporated in resin compositions of this type, with the proviso that the additives are selected so as to not significantly adversely affect the desired properties of the thermoplastic composition. Combinations of additives can be used. Such additives can be mixed at a suitable time during the mixing of the components for forming the composition. Exemplary additives are described in U.S. Pat. No. 7,666,872 and U.S. Patent Publication No. 20090105444.

Thermoplastic compositions comprising the isosorbide-based polycarbonate can be manufactured by various methods. For example, powdered isosorbide-based polycarbonate, other polymer (if present), and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

The homo and copolycarbonates may be used in making various articles including, but not limited to a film, a sheet, an optical wave guide, a display device and a light emitting diode prism. Furthermore the polycarbonates may further be used in making articles such as, exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV light, whether natural or artificial, during their lifetimes, and most particularly outdoor articles; i.e., those intended for outdoor use. Suitable articles are exemplified by automotive, truck, military vehicle, and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

The isosorbide-based polycarbonates are further illustrated by the following non-limiting examples.

The polycarbonate compositions in mole percent (mol %) describes the composition of all dihydroxy functional monomers used in making the polycarbonate. This composition corresponds closely to the composition of the resulting polymer as determined by $^1$H NMR for the majority of the samples. Polycarbonate compositions in weight percent (wt %) are approximate and rounded numbers, calculated from the monomer composition in moles. Bio content in weight percent was calculated by dividing the mass of isosorbide, Priplast™ and Pripol™ derived atoms by the total mass of the entire polymer chain. End groups were not considered in calculations of bio-content, composition in mol %, and composition in weight percent. A sample calculation is shown below. The bio-content in weight percent is the sum of the last column shown in the calculation table.

|  | Molar Composition | Bio | Bio wt % calculation | | Contribution | | |
| --- | --- | --- | --- | --- | --- | --- | --- |
|  |  |  |  | Formula | to total |  |  |
|  |  |  | Formula | weight in | formula |  | Wt % |
|  | Quantity | ingredient | weight | chain* | weight** |  | bio- |
|  | (mol %) | (Y/N) | (g/mol) | (g/mol) | (g/mol) | Wt % | content |
| Isosorbide | 50.00 | Y | 146.14 | 144.14 | 36.04 | 33.80 | 33.80 |
| Priplast, Pripol | 0.00 | Y | 566.95 | 532.95 | 0.00 | 0.00 | 0.00 |
| BPA | 50.00 | N | 228.29 | 226.29 | 56.57 | 53.06 | 0.00 |
| Siloxane | 0.00 | N | 3679 | 3677 | 0.00 | 0.00 | 0.00 |
| C=O | 100.00 | N | 28.01 | 28.01 | 14.01 | 13.14 | 0.00 |

*formula weight of monomer minus the formula weight of leaving group from polymerization
**formula weight in chain x (mol % of monomer/total mol %)

Isosorbide is abbreviated as IS. Bisphenol A is abbreviated as BPA. Pripol™ 1009 is a branched fatty acid dimer consisting of 36 carbon atoms with an average molar mass of approximately 567 grams per mole (g/mol). Priplast™ 3162 is a dihydroxy compound that is an oligomer of dimerized fatty acids with average molar mass of approximately 1000 grams per mole. Priplast™ 1838 is a dihydroxy compound that is an oligomer of dimerized fatty acids with average molar mass of approximately 2000 g/mol. The Pripol and Priplast materials are available from Uniqema PDMS denotes a eugenol endcapped polydimethylsiloxane (PDMS) chain with two aromatic OH groups at its chain ends having a siloxane content of 95 weight percent based on the total weight of the PDMS and a siloxane chain length of 45 (E in formula (16)).

The polycarbonates were made in melt by adding 101 to 103% of carbonate precursor (bis(methylsalicyl) carbonate (BMSC)) to the total of 100 mol % of dihydroxy functional monomers. A 200 liter stainless steel stirred tank reactor was charged with BMSC, isosorbide, polysiloxane, aliphatic units and optionally BPA. No catalyst was added to the reactor. The reactor was then evacuated and purged with nitrogen three times to remove residual oxygen and then put to a constant pressure of 800 mbar. Then the temperature was increased to 130° C. in order to melt and to dissolve the monomers. The temperature was then reduced to 100° C. The monomer mixture was then pumped to a PFR (plug flow reactor). At the start of the PFR there is continuous addition of an aqueous solution of sodium hydroxide to the monomer mix using a HPLC pump. The PFR is operated at 180° C.-200° C. and a pressure of 4-5 bar. The oligomer out of the PFR is transferred to a flash devolatilisation system The flash devolatilization system consists of a pre-heater and a flash vessel. The pre-heater is operated at approximately 240° C. and 200 mbar, the flash vessel is operated at 190° C. and 180 mbar. Under the flash vessel there is a melt pump which transfers the material to the extruder. The extruder was a Werner & Pfleiderer ZSK25WLE 25 mm 13-barrel twin-screw extruder with an L/D=59. The reaction mixture was reactively extruded at a 250-rpm screw speed. The extruder barrels were set to 270° C. and the die was set to 280° C. The extruder was equipped with five forward vacuum vents and one back-vent. The extruder has one vacuum systems called hi-vac, all the vent are connected to this system and have a vacuum of ~1 mbar The methyl salicylate byproduct was removed via devolatilization through these vents. Collected at the end of the extruder through a die were molten strands of polymer that were solidified through a water bath and pelletized.

The polycarbonate was extruded using the conditions described below on a twin screw extruder. During extrusion, 0.02% weight percent of a 45 weight percent $H_3PO_3$ solution in water was added to stabilize the polymer and minimize degradation. 0.3 weight percent PETS was added as a mold release agent. Weight percents are based on the total weight of the composition. No other additives and/or colorants were used. Materials were extruded on a twin screw extruder using the following settings:

| Temperature zone 1 | 50° C. |
| --- | --- |
| Temperature zone 2 | 200° C. |
| Temperature zone 3 | 250° C. |
| Temperature zone 4 | 270° C. |
| Temperature zone 5 | 280° C. |
| Temperature zone 6 | 280° C. |
| Temperature zone 7 | 280° C. |
| Temperature zone 8 | 280° C. |
| Speed | 300 rpm |
| Vacuum | full |

Molding was done using these settings:
Temperature zone 1: 240° C.
Temperature zone 2: 250° C.
Temperature zone 3: 260° C.
Temperature zone 4: 250° C.
Temperature mold: 60-70° C.
Injection Speed: 35-50 mm/s
After pressure: Between 50 and 70 bars
Drying time: 6 hours at 85° C.

Vicat softening temperature was determined according to ISO306:2004 using a heating rate of 120° C./hour and a force of 50 Newtons (method B120). Test specimens of 10×10×4 mm were cut from molded 80×10×4 mm ISO impact bars. Each test was repeated and the average of the two results was reported.

Heat deflection temperature was determined according to ISO75:2004 using 1.8 megaPascal (Mpa) stress on the flat surface (method A). Measurements were preformed on molded ISO bars (80×10×4 mm) which were preconditioned at 23° C. and 50% relative humidity for 48 hrs. The heating medium of the HDT equipment was mineral oil. Measurements were performed in duplo and the average value was reported.

Glass transition temperature (Tg) was determined using differential scanning calorimetry (DSC) with a heating rate of 10° C./minute and using the second heating curve for Tg determination.

Notched Izod impact was determined according to ISO 180:2000, method A test protocol. The test was repeated five times on 80×10×3 mm molded impact bars which had been notched. The test specimens were conditioned at 23° C. and 50% relative humidity for 48 hours. The impact velocity was 3.5 m/s with a pendulum energy of 5.5 J. The clamping height was 40 mm The test was conducted at 23° C. Results are reported as the average of the five measurements in the unit kilojoules per square meter. All test specimens broke completely.

Weight average molar masses for Examples 1-13 and 16 were in the range of 39,000 to 46,000 grams per mole (g/mol). Example 14 (70,000 g/mol), Example 15 (62,000 g/mol) and Example 17 (57,000 g/mol). Weight average molar mass was measured using size exclusion chromatography calibrated with polystyrene standards.

atoms. There is a surprisingly large increase in Notched Izod strength while maintaining the heat properties of Vicat, HDT and Tg.

EX-10 compared to EX-3, and a comparison among EX-4, EX-9 and EX-11 indicates a surprising synergy between PDMS and aliphatic units derived from an oligomer copolymerized in isosorbide polycarbonates in terms of impact performance.

The singular forms "a," "an," and "the" include plural referents unless the context clearly dictates otherwise. Unless defined otherwise, technical and scientific terms used herein have the same meaning as is commonly understood by one of skill in the art to which this invention belongs. The endpoints of all ranges directed to the same component or property are

TABLE 1

| | Polymer composition (mol %) | | | | | | Approximate polymer composition (weight percent) | | | | | |
|---|---|---|---|---|---|---|---|---|---|---|---|---|
| | IS | BPA | PDMS | Priplast 1838 | Priplast 3162 | Pripol 1009 | IS | BPA | PDMS | Priplast 1838 | Priplast 3162 | Pripol 1009 |
| EX-1* | 100.00 | | | | | | 100 | | | | | |
| EX-2* | 99.82 | | 0.18 | | | | 97 | | 4 | | | |
| EX-3* | 99.75 | | 0.25 | | | | 95 | | 5 | | | |
| EX-4* | 99.50 | | 0.50 | | | | 90 | | 10 | | | |
| EX-5* | 65.00 | 28.00 | | | | 7.00 | 50 | 32 | | | | 18 |
| EX-6* | | 100.00 | | | | | | 100 | | | | |
| EX-7* | 10.00 | 90.00 | | | | | 7 | 93 | | | | |
| EX-8* | 30.00 | 70.00 | | | | | 22 | 78 | | | | |
| EX-9* | 97.00 | | | | 3.00 | | 85 | | | | 15 | |
| EX-10 | 96.75 | | 0.25 | | 3.00 | | 80 | | 5 | | 15 | |
| EX-11 | 96.50 | | 0.50 | | 3.00 | | 75 | | 10 | | 15 | |
| EX-12* | 97.75 | | 0.25 | | | 2.00 | 89 | | 5 | | | 6 |
| EX-13* | 95.50 | | 0.50 | | | 4.00 | 79 | | 10 | | | 11 |
| EX-14* | 86.50 | 30.90 | 0.60 | | | | 54 | 36 | 10 | | | |
| EX-15* | 85.30 | 14.40 | 0.26 | | | | 76 | 19 | 5 | | | |
| EX-16* | 73.10 | 26.60 | 0.30 | | | | 62 | 33 | 5 | | | |
| EX-17* | 98.00 | | | 2.00 | | | 80 | | | 20 | | |

| | Bio content (weight percent) | VICAT softening temp. (° C.) | Heat deflection temp. (° C.) | Tg (DSC) (° C.) | Notched ISO impact on 80 × 10 × 3 notched impact bars in kJ/m² | | | | | | |
|---|---|---|---|---|---|---|---|---|---|---|---|
| | | | | | 23° C. | 10° C. | 0° C. | −10° C. | −20° C. | −30° C. | −40° C. |
| EX-1* | 84 | 158 | 137 | 169 | 9 | 9 | 8 | 8 | 6 | 6 | 6 |
| EX-2* | 81 | 157 | 136 | 166 | 10 | 9 | 9 | 8 | 8 | 6 | 8 |
| EX-3* | 79 | 155 | 135 | 163 | 19 | 13 | 12 | | 11 | 11 | 10 |
| EX-4* | 76 | 157 | 132 | 167 | 33 | | 29 | 23 | 18 | | |
| EX-5* | 59 | 106 | 77 | 118 | 5 | | | | 4 | | |
| EX-6* | 0 | 142 | 125 | 147 | 70 | | | | | 12 | |
| EX-7* | 6 | | 124 | | 63 | | | | | | |
| EX-8* | 19 | | 124 | | 4 | | | | | | |
| EX-9* | 86 | 130 | 115 | 152 | 11 | 8 | 9 | 8 | 7 | 7 | 7 |
| EX-10 | 82 | 128 | 114 | 152 | 57 | 48 | 39 | 24 | 20 | 16 | 13 |
| EX-11 | 78 | 124 | 112 | 154 | 107 | 90 | 77 | 71 | 32 | 19 | 13 |
| EX-12* | 81 | | 122 | 156 | 14 | 12 | 10 | 11 | 9 | 9 | 7 |
| EX-13* | 78 | | 108 | 149 | 36 | 22 | 16 | 14 | 13 | 13 | 12 |
| EX-14* | 45 | 151 | 128 | | 56 | 52 | 46 | 42 | 37 | | 23 |
| EX-15* | 64 | | 128 | 165 | 26 | 18 | 14 | 12 | | 11 | 11 |
| EX-16* | 52 | | 128 | | 53 | 32 | 15 | 15 | 14 | 12 | 11 |
| EX-17* | 87 | 94 | | 165 | 30 | | | | | | |

*Comparative example

EX-9 compared to EX-10 and EX-11 shows the effect of copolymerizing PDMS in the isosorbide copolycarbonate with an aliphatic oligomer having a molecular weight of 900 to 2500. Impact values of the examples having the PDMS go up to values surpassing that of BPA-PC (EX-6) while heat (Vicat, HDT & Tg) are not affected. Bio content is as high as 82%. EX-10 and EX-11 compared to EX-12 and EX-13 show the benefit of the aliphatic block derived from an oligomer having a molecular weight of 950 to 2500 compared to an aliphatic block derived from a dimer consisting of 36 carbon inclusive and independently combinable (e.g., ranges of "less than or equal to about 25 weight percent, or, more specifically, about 5 weight percent to about 20 weight percent," is inclusive of the endpoints and all intermediate values of the ranges of "about 5 weight percent to about 25 weight percent," etc.). The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. As used herein, "comprising" is inclusive of "consisting essentially of" and "consisting of". All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. As used herein, the term "hydrocarbyl" refers broadly to a substituent comprising carbon and hydrogen, optional with at least one heteroatoms, for example, oxygen, nitrogen, halogen, or sulfur; "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—). Where used, wavy bonds in structural formulas are included as generally in the art to show single bonds with unspecified stereochemistry.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polycarbonate polymer comprising: an isosorbide unit, a polysiloxane unit, and an aliphatic unit different from the isosorbide unit, wherein the isosorbide unit, polysiloxane unit, and aliphatic unit are each carbonate, or a combination of carbonate and ester units, the aliphatic unit different from the isosorbide unit is derived from an aliphatic oligomer having a molecular weight of 900 to 4000 g/mol, and the calculated bio-content is greater than or equal to 40 weight percent, based on the total weight of the polycarbonate polymer, wherein the polycarbonate polymer has a glass transition temperature of 140 to 170° C.

2. The polycarbonate polymer of claim 1, wherein the isosorbide units are present in an amount of 50 to 92 weight percent based on the total weight of dihydroxy compound, polyol and diacid used to make the polycarbonate.

3. The polycarbonate polymer of claim 1, wherein the polysiloxane units are present in an amount of 3 to 30 weight percent based on the total weight of dihydroxy compound, polyol and diacid used to make the polycarbonate.

4. The polycarbonate of claim 1, wherein the aliphatic oligomer has a weight average molecular weight of 900 to 3000 g/mol.

5. The polycarbonate of claim 1, wherein the aliphatic oligomer has a weight average molecular weight of 900 to 2500 g/mol.

6. The polycarbonate polymer of claim 1, wherein the aliphatic units are present in an amount of 5 to 20 weight percent based on the total weight of dihydroxy compound, polyol and diacid used to make the polycarbonate.

7. The polycarbonate polymer of claim 1, wherein the aliphatic units are derived from a monomer of the formula X-L-X wherein X represents a carboxylic acid (—C(O)OH) or a methylol group (CH$_2$—OH) and L represents a group having greater than or equal to 60 carbon atoms.

8. The polycarbonate polymer of claim 1, further comprising a carbonate unit derived from an aromatic dihydroxy compound.

9. The polycarbonate polymer of claim 1, wherein the polycarbonate has calculated bio-content greater than or equal to 65 weight percent based on the total weight of the polycarbonate.

10. The polycarbonate polymer of claim 1, wherein the polycarbonate has calculated bio-content of 75 to 85 weight percent based on the total weight of the polycarbonate.

11. The polycarbonate polymer of claim 1, wherein the polycarbonate has a glass transition temperature of 150 to 170° C.

12. The polycarbonate polymer of claim 1, wherein the polycarbonate has a notched Izod impact strength greater than or equal to 13 kilojoules per square meter (kJ/m$^2$) at 23° C.

13. The polycarbonate polymer of claim 1, wherein the polysiloxane units are derived from a dihydroxy compound that comprises diorganosiloxane units blocks of formula (15):

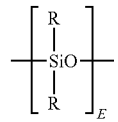

(15)

wherein each occurrence of R is same or different, and is a C$_{1-13}$ monovalent organic group and E has an average value of about 10 to about 70.

14. A polycarbonate polymer comprising: 70 to 89 weight percent of isosorbide units, 5 to 15 weight percent of polysiloxane units, and 6 to 15 weight percent of aliphatic units different from the isosorbide unit, wherein the isosorbide unit, polysiloxane unit, and aliphatic unit different from the isosorbide units are each carbonate, or a combination of carbonate and ester units, the aliphatic units have a molecular weight of 900 to 4000 g/mol, the amounts of isosorbide units, polysiloxane units and aliphatic units are based on the total weight of dihydroxy compound, polyol and diacid used to make the polycarbonate, and the calculated bio-content is greater than or equal to 40 weight percent, based on the total weight of the polycarbonate polymer, wherein the polycarbonate polymer has a glass transition temperature of 140 to 170° C.

15. The polycarbonate of claim 14, wherein the aliphatic units have a weight average molecular weight of 900 to 3000 g/mol.

16. The polycarbonate of claim 14, wherein the aliphatic units have a weight average molecular weight of 900 to 2500 g/mol.

17. The polycarbonate polymer of claim 14, wherein the aliphatic units are derived from a monomer of the formula X-L-X wherein X represents a carboxylic acid (—C(O)OH) or a methylol group (CH$_2$—OH) and L represents a group having greater than or equal to 60 carbon atoms.

18. A thermoplastic composition comprising a polymer and a polycarbonate polymer comprising an isosorbide unit, a polysiloxane unit, and an aliphatic unit different from the isosorbide unit, wherein the isosorbide unit, polysiloxane unit, and aliphatic unit are each carbonate, or a combination of carbonate and ester units and the aliphatic unit is derived from an aliphatic oligomer having a molecular weight of 900 to 4000 g/mol, wherein the polycarbonate polymer has a glass transition temperature of 140 to 170° C.

19. A polycarbonate polymer comprising: 70 to 89 weight percent of isosorbide units, 5 to 15 weight percent of polydimethylsiloxane units, and 6 to 15 weight percent of aliphatic units different from the isosorbide unit, wherein the isosorbide unit, polydimethylsiloxane unit, and aliphatic unit different from the isosorbide units are each carbonate, or a combination of carbonate and ester units, the aliphatic unit different from the isosorbide unit is derived from an aliphatic oligomer having a molecular weight of 900 to 2500 g/mol, the amounts of isosorbide units, polydimethylsiloxane units and aliphatic units are based on the total weight of dihydroxy compound, polyol and diacid used to make the polycarbonate, and the calculated bio-content is greater than or equal to 40 weight percent, based on the total weight of the polycarbonate polymer, wherein the polycarbonate polymer has a glass transition temperature of 140 to 170° C.

* * * * *